US010494260B2

(12) United States Patent
Smith et al.

(10) Patent No.: US 10,494,260 B2
(45) Date of Patent: *Dec. 3, 2019

(54) TARGET HOLDERS, MULTIPLE-INCIDENCE ANGLE, AND MULTIZONE HEATING FOR BNNT SYNTHESIS

(71) Applicant: BNNT, LLC, Newport News, VA (US)

(72) Inventors: Michael W. Smith, Newport News, VA (US); Kevin C. Jordan, Newport News, VA (US); Jonathan C. Stevens, Williamsburg, VA (US); R. Roy Whitney, Newport News, VA (US)

(73) Assignee: BNNT, LLC, Newport News, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/379,507

(22) Filed: Apr. 9, 2019

(65) Prior Publication Data

US 2019/0233286 A1 Aug. 1, 2019

Related U.S. Application Data

(60) Continuation of application No. 15/659,149, filed on Jul. 25, 2017, now Pat. No. 10,294,106, which is a
(Continued)

(51) Int. Cl.
*C01B 21/064* (2006.01)
*B01J 19/12* (2006.01)

(52) U.S. Cl.
CPC ......... *C01B 21/0641* (2013.01); *B01J 19/121* (2013.01); *B01J 2219/0871* (2013.01); *B01J 2219/0879* (2013.01); *C01P 2004/13* (2013.01)

(58) Field of Classification Search
CPC ... B01J 10/005; B01J 19/121; C01B 21/0641; C01P 2004/13
See application file for complete search history.

(56) References Cited

U.S. PATENT DOCUMENTS 3,216,942 A 11/1965 Wentorf
3,352,637 A 11/1967 Heymer
(Continued)

FOREIGN PATENT DOCUMENTS

CA 2689629 2/2009
KR 2011-0113201 10/2011
(Continued)

OTHER PUBLICATIONS

Apr. 14, 2017 International Search Report issued in International Application No. PCT/US2017/016250.
(Continued)

*Primary Examiner* — Lessanework Seifu
(74) *Attorney, Agent, or Firm* — Joshua B. Brady; Nixon & Vanderhye, P.C.

(57) ABSTRACT

In the synthesis of boron nitride nanotubes (BNNTs) via high temperature, high pressure methods, a boron feedstock may be elevated above its melting point in a nitrogen environment at an elevated pressure. Methods and apparatus for supporting the boron feedstock and subsequent boron melt are described that enhance BNNT synthesis. A target holder having a boron nitride interface layer thermally insulates the target holder from the boron melt. Using one or more lasers as a heat source, mirrors may be positioned to reflect and control the distribution of heat in the chamber. The flow of nitrogen gas in the chamber may be heated and controlled through heating elements and flow control baffles to enhance BNNT formation. Cooling systems and baffle elements may provide additional control of the BNNT production process.

20 Claims, 11 Drawing Sheets

Related U.S. Application Data division of application No. 15/053,200, filed on Feb. 25, 2016, now Pat. No. 9,745,192, which is a continuation of application No. PCT/US2015/058615, filed on Nov. 2, 2015.

(60) Provisional application No. 62/194,972, filed on Jul. 21, 2015, provisional application No. 62/074,002, filed on Nov. 1, 2014, provisional application No. 62/074,004, filed on Nov. 1, 2014.

(56) References Cited

U.S. PATENT DOCUMENTS

| | | |
|---|---|---|
| 4,913,887 A | 4/1990 | Sato |
| 5,305,612 A | 4/1994 | Higham |
| 5,593,740 A | 1/1997 | Strumban |
| 5,932,294 A | 8/1999 | Colombo |
| 6,967,011 B1 | 11/2005 | Saboungi |
| 7,335,890 B2 | 2/2008 | Utterback |
| 7,582,880 B2 | 9/2009 | Wallace |
| 7,704,480 B2 | 4/2010 | Jiang |
| 7,927,525 B2 | 4/2011 | Lizotte |
| 7,993,620 B2 | 8/2011 | Lashmore |
| 8,206,674 B2 | 6/2012 | Smith |
| 8,309,242 B2 | 11/2012 | Wei |
| 8,602,765 B2 | 12/2013 | Jiang |
| 8,673,120 B2 | 3/2014 | Whitney et al. |
| 8,703,023 B2 | 4/2014 | Sainsbury |
| 8,753,578 B1 | 6/2014 | Smith |
| 2002/0113335 A1 | 8/2002 | Lobovsky |
| 2004/0061047 A1 | 4/2004 | Bolozdynya |
| 2005/0116336 A1 | 6/2005 | Chopra |
| 2005/0118090 A1 | 6/2005 | Shaffer |
| 2005/0126766 A1 | 6/2005 | Lee |
| 2005/0155358 A1 | 7/2005 | Ash |
| 2005/0237442 A1 | 10/2005 | Yamazaki |
| 2006/0098389 A1 | 5/2006 | Liu |
| 2006/0173397 A1 | 8/2006 | Tu |
| 2007/0004225 A1 | 1/2007 | Lu |
| 2008/0138577 A1 | 6/2008 | Sheehan |
| 2008/0150165 A1 | 6/2008 | Stumbo |
| 2008/0153959 A1 | 6/2008 | Charati |
| 2008/0187657 A1 | 8/2008 | Altan |
| 2008/0191395 A1 | 8/2008 | Johnson |
| 2008/0296559 A1 | 12/2008 | Kreupl |
| 2009/0117021 A1 | 5/2009 | Smith |
| 2010/0051879 A1 | 3/2010 | Sainsbury |
| 2010/0108276 A1 | 5/2010 | Kuwahara |
| 2010/0192535 A1 | 8/2010 | Smith |
| 2011/0104534 A1 | 5/2011 | Wei |
| 2011/0140318 A1 | 6/2011 | Reeves |
| 2011/0143915 A1 | 6/2011 | Yin |
| 2011/0212308 A1 | 9/2011 | Brown |
| 2012/0045688 A1 | 2/2012 | Liu |
| 2012/0085970 A1 | 4/2012 | Zhang |
| 2012/0168299 A1 | 7/2012 | Whitney |
| 2012/0199747 A1 | 8/2012 | Letant |
| 2012/0321785 A1 | 12/2012 | Rogers |
| 2013/0029242 A1 | 1/2013 | Mizuhata |
| 2013/0064750 A1 | 3/2013 | Zettl |
| 2013/0099264 A1 | 4/2013 | Zimmerman |
| 2013/0144576 A1 | 6/2013 | Gnoffo et al. |
| 2013/0255906 A1 | 10/2013 | Chang |
| 2014/0042330 A1 | 2/2014 | Gozani |
| 2014/0217693 A1 | 8/2014 | Schmidt |
| 2014/0364529 A1 | 12/2014 | Park et al. |
| 2015/0033937 A1 | 2/2015 | Lashmore |
| 2015/0125374 A1 | 5/2015 | Smith et al. |
| 2016/0083253 A1 | 3/2016 | Kim |
| 2016/0144401 A1 | 5/2016 | Carter |

FOREIGN PATENT DOCUMENTS

| | | |
|---|---|---|
| WO | 2008/113892 | 9/2008 |
| WO | 2009/017526 | 2/2009 |
| WO | 2012/096775 | 7/2012 |
| WO | 2013/021797 | 7/2012 |
| WO | 2012/108941 | 8/2012 |
| WO | 2013/082117 | 6/2013 |
| WO | 2014/169382 | 10/2014 |
| WO | 2014/197675 | 12/2014 |
| WO | 2015/164777 | 10/2015 |
| WO | 2016/100715 | 6/2016 |

OTHER PUBLICATIONS

Cohen et al., "The physics of boron nitride nanotubes," Physics Today, vol. 63, No. 11, Nov. 1, 2010, pp. 34-38.

Dec. 10, 2018 Extended European Search Report issued in European Application No. 16796866.8.

Dec. 11, 2017 Office Action issued in U.S. Appl. No. 15/305,994 (with Dec. 12, 2017 Supplemental Action).

Dec. 21, 2017 Office Action issued in U.S. Appl. No. 15/540,539.

Demirel M.C. et al., "Spatially Organized Free-Standing Poly(p-xylylene) Nanowires Fabricated by Vapor Deposition", Langmuir, 2007, vol. 23, issue 11, pp. 5861-5863; retrieved from the Internet: <DOI: 10.1021/la700538f>.

Feb. 9, 2017 Notice of Preliminary Rejection issued in Korean Application No. 10-2016-7031895.

Feb. 17, 2015 International Search Report issued in International Application No. PCT/US2014/63349.

Feb. 17, 2015 Written Opinion issued in International Application No. PCT/US2014/63349.

Gnoffo, et al., "Modeling of Laser Vaporization and Plume Chemistry in a Boron Nitride Nanotube Production Rig" NASA Technical Reports Server (NTRS) 20120011733, 23 pages, Jun. 25, 2012 (Jun. 25, 2012), accessed online at https://archive.org/details/NASA NTRS Archive 20120011733.

Goldberg D. et al., "Boron Nitride Nanotubes and Nanosheets", ACS Nano, 2010, vol. 4, issue 6, pp. 2979-2993; retrieved from the Internet: <DOI: 10.1021/nn1006495>.

Hong et al., Strong viscous behavior discovered in nanotube mats, as observed in boron nitride nanotube mats, Composites Part B, vol. 91, Feb. 8, 2016, retrieved Mar. 13, 2018, Retrieved from the Internet: <URL: https://pdfs.semanticscholar.org/ba63/afeeecba9dc121b4c71625f5a0942244d862.pdf, pp. 56-64.

Hutchings C. W. et al., "Apparatus tor chemical vapor deposition of polymide films", Review of Scientific Instruments, 1995, vol. 66, issue 7, pp. 3943-3947; retrieved from the Internet: <DOI: 10.1063/1.1145399>.

Islam et al., Characterization of Carbon Fiber Reinforced Epoxy Composites Modified with Nanoclay and Carbon Nanotubes, Procedia Engineering, vol. 105, 2015, retrieved Mar. 14, 2018, retrieved from the Internet: <URL:https://ac.els-cdn.com/S1877705815008759/1-s2.0-S1877705815008759-main.pdf?_tid:9b94e13b-400c-46a3-b3af-1bdfbc3000af&acdnat=1521215859_72ca270e12acadfde8d5b0c07cf0ac1c., pp. 821-828.

Jan. 5, 2018 Office Action issued in Canadian Application No. 2945977.

Jan. 12, 2018 Communication issued in European Application No. 16796866.8.

Jan. 29, 2018 International Preliminary Examination Report issued in International Application No. PCT/US2017/016250.

Jul. 26, 2018 Supplemental Search Report issued in European Application No. 15 87 1103.

Jun. 7, 2017 Communication pursuant to Article 94(3) EPC issued in European Application No. 15 783 501.8.

Jun. 9, 2017 International Preliminary Report on Patentability issued in International Application No. PCT/US2016/032385.

Jun. 9, 2017 Office Action issued in Canadian Application No. 2945977.

Kingston, "Large-scale synthesis of few-walled small diameter boron nitride nanotubes (sub-10 nm) by an induction thermal plasma," NT13 Espoo, Finland, Jun. 28, 2013.

Mar. 13, 2018 Notification of Reasons for Refusal issued in Japanese Application No. 2017-507928.

Mar. 28, 2018 International Search Report issued in International Application No. PCT/US2018/017231.

(56) References Cited

OTHER PUBLICATIONS

Mar. 28, 2018 Written Opinion issued in International Application No. PCT/US2018/017231.
May 24, 2018 Supplementary European Search Report issued in European Application No. 15854542.6.
Nishiwaki et al., Atomic structures and formation mechanism of boron nitride nanotubes and nanohorns synthesized by arc-melting LaB6 powders, J. of the European Ceramic Society 26, 2006, pp. 435-441.
Nov. 7, 2017 Communication pursuant to Article 94(3) EPC issued in European Application No. 15 783 501.8.
Nov. 19, 2018 Office Action issued in Canadian Application No. 2945977.
Nov. 21, 2017 Notification of Reasons for Refusal issued in Japanese Application No. 2017507928.
Nov. 29, 2018 Extended European Search Report issued in European Application No. 16793614.5.
Oct. 13, 2017 International Search Report issued in International Application No. PCT/US2017/043140.
Oct. 13, 2017 Written Opinion issued in International Application No. PCT/US2017/043140.
Oct. 20, 2017 Office Action issued in U.S. Appl. No. 15/689,500.
Oct. 22, 2018 Supplementary European Search Report issued in European Application No. 15871103.6.
Peters et al., "A New Fullerene synthesis," Angew. Chem. Int. Ed., vol. 31, No. 2, , 1992, VCH Verlagsgesellschaft mbH, W-6940 Weinheim, pp. 223-224.
Putkonen M. et al., "Atomic layer deposition of polymide thin films", Journal of Materials Chemistry, 2006, vol. 17, issue 7, pp. 664-669; retrieved from the Internet: <DOI: 10.1039/B612823H>.
Tiano et al., "Boron Nitride Nanotube: Synthesis and Applications," Proc. of SPIE, vol. 9060, 2014.
Yanagishita H. et al., "Preparation of polyimide composite membrane by chemical-vapor-deposition and polymerization technique (CVDP)", Journal of Applied Polymer Science, 1993, vol. 49, issue 4, pp. 565-572; retrieved from the Internet: <DOI: 10.1002/app.1993.070490402>.
Apr. 11, 2016 International Search Report and Written Opinion issued in PCT/US2015/066464.
Aug. 7, 2015 International Search Report and Written Opinion issued in PCT/US2015/027570.
Aug. 26, 2016 International Search Report and Written Opinion issued in PCT/US2016/032385.
Fathalizadeh et al., Nano Lett., 2014, 14, 4881.
Feb. 2, 2017 Extended European Search Report issued in European Application No. 15783501.8.
Feb. 15, 2015 International Search Report and Written Opinion issued in PCT/US2014/063349.
Hanafin et al., Boron Fiber Neutron Shielding Properties, Specialty Materials, 2011 (Retrieved on Jul. 14, 2016) from Internet URL <http://www.specmaterials.com/pdfs/boronneutronshielding.pdf> p. 1.
Jan. 19, 2016 International Search Report and Written Opinion issued in PCT/US2015/058615.
Kim et al., ACS Nano, 2014, 8, 6211.
Mar. 7, 2017 Korean Preliminary Office Action issued in Korean Application No. 10-2016-7031895 (with English language translation).
May 26, 2016 International Search Report and Written Opinion issued in PCT/US2016/023432.
Mukhanov et al., On Electrical Conductivity of Melts of Boron and Its Compounds Under Pressure, Journal of Superhard Materials, vol. 37, No. 4, 2015, pp. 289-291.
Nov. 17, 2016 Canadian Office Action issued in Canadian Application No. 2945977.
Oct. 25, 2016 Australian Examiner's First Patent Examination Report issued in Australian Patent Application No. 2015249316.
Smith et al., Very Long Single and Few-walled Boron Nitride Nanotubes via the Pressurized Vapor/Condenser Method, Nanotechnology, 2009.
Su et al., Selective Growth of Boron Nitride Nanotubes by Plasma-Assisted and Iron-Catalytic CVD Methods, J. Phys. Chem., Jul. 22, 2009, 113, pp. 14681-14688.
Wang et al., Recent Advancements in Boron Nitride Nanotubes, Nanoscale, 2010, 2, 2028-2034.
Yu et al., Dispersion of boron nitride nanotubes in aqueous solution with the help of ionic surfactants. Solid State Communications 149 (2009) 763-766. (Retrieved Jul. 14, 2016 from internet URL <http://dro.deakin.edu.au/view/ DU:30029180> pp. 763-766.

TARGET HOLDERS, MULTIPLE-INCIDENCE ANGLE, AND MULTIZONE HEATING FOR BNNT SYNTHESIS

CROSS-REFERENCE TO RELATED APPLICATIONS

This application is a continuation of U.S. application Ser. No. 15/659,149, filed Jul. 25, 2017, which is a divisional of U.S. application Ser. No. 15/053,200, filed Feb. 25, 2016, now issued as U.S. Pat. No. 9,745,192, which is a continuation of International Application No. PCT/US2015/058615, filed Nov. 2, 2015, which claims the benefit of U.S. Provisional Application No. 62/074,002, filed Nov. 1, 2014, U.S. Provisional Application No. 62/074,004, filed Nov. 1, 2014, and U.S. Provisional Application No. 62/194,972, filed Jul. 21, 2015. The contents of each application are expressly incorporated by reference.

STATEMENT REGARDING GOVERNMENT SUPPORT

None.

FIELD

The present disclosure generally relates to generating boron melts and enhancing the synthesis of boron nitride nanotubes.

BACKGROUND

Generally, BNNT structures may be formed by thermally exciting a boron feedstock in a chamber in the presence of nitrogen gas at an elevated pressure. Unlike carbon nanotubes (CNTs), U.S. Pat. No. 8,206,674 to Smith et al., incorporated by reference in its entirety, indicates that BNNTs form without the presence of chemical catalysts, and preferably at elevated pressures of about 2 atm to about 250 atm. CNTs, on the other hand, typically require the presence of chemical catalysts such as metal catalysts. It has been shown that BNNTs do not form in the presence of such catalysts, indicating that the formation of BNNTs is fundamentally different than the formation of CNTs.

Most contemporary BNNT synthesis methods have severe shortcomings, including one or more of having low yield, short tubes, discontinuous production, poor crystallinity (i.e., many defects in molecular structure), poor alignment and high levels of boron impurities. Although there is no agreed upon standard in the scientific literature, the term 'high quality' BNNTs generally refers to long, flexible, molecules with few defects in the crystalline structure of the molecule.

BRIEF SUMMARY

This disclosure relates to apparatus, systems, and methods for the production of BNNTs where the source of boron is a ball of melted boron in a nitrogen environment and the boron ball is supported on a thin an interface layer of material that provides the required thermal insulation from the surrounding support structures. In addition, the heat being supplied to the process can come from multiple zones in the process including multiple directions in the case where the heat source is directional.

DESCRIPTION

Described herein are methods and apparatus for synthesizing boron nitride nanotubes, such as through a high temperature, high pressure process. The following description should not be taken in a limiting sense, and is made for the purpose of illustrating embodiments of the present approach.

Figure 1:
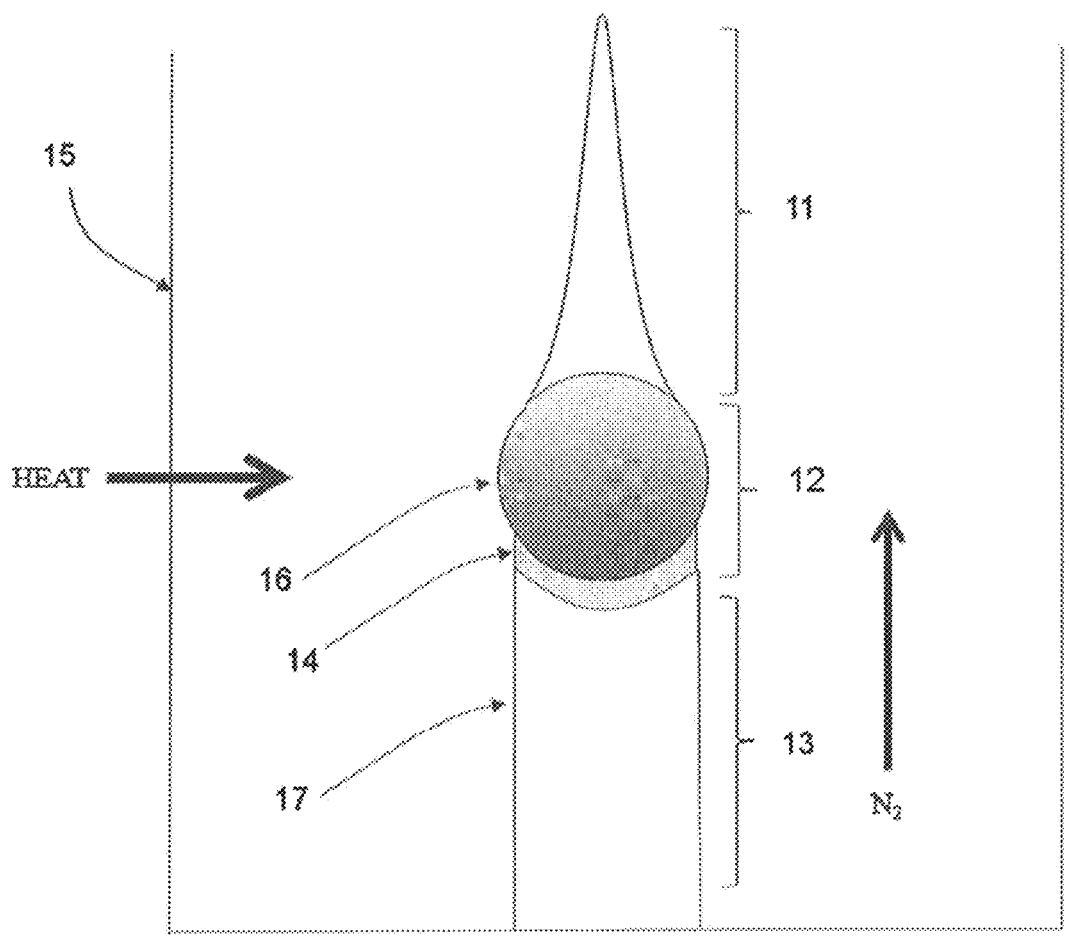
FIG. 1 illustrates heating zones in an embodiment of an apparatus for heating a boron feedstock to a boron melt.

The synthesis of boron nitride nanotubes (BNNTs) by a high temperature, high pressure (HTP) process, also known as the pressurized vapor/condenser method (PVC), may involve heating boron to a liquid boron melt. A boron feedstock may be heated to form a liquid boron melt by heating all or a portion of the boron feedstock to a temperature near boron's smoking point. In most HTP processes, the boron feedstock is heated to a boron melt in a nitrogen atmosphere under elevated pressure, typically greater than 2 atmospheres, such as about 2 atm to about 250 atm, and in some embodiments about 2 atmospheres to about 12 atmospheres. This disclosure describes heating the boron feedstock (sometimes referred to as the boron ball, even though the feedstock may not be spherical in some instances) to generate a boron melt in an HTP process, terms of three heating zones, as shown in FIG. 1. This application refers to these heat zones as preheat-support zone 13, boron melt zone 12, and BNNT growth zone 11. It should be noted that in some embodiments, there may be a gradual transition and/or overlap between zones. Also, any transition and/or overlap between zones may change during operation at time continues, such as, for example, from start-up to continuous production as near steady-state conditions.

It should be noted that the processes and systems described herein do not apply to the formation of carbon nanotubes (CNTs). HTP BNNT synthesis processes and systems involve forming a liquid material from a boron feedstock in more or less steady state and at very high temperature, the boron in a high pressure gaseous environment, and nitrogen, such that the process produces combination of the liquid material and the gas, without involving catalysts or other elemental species. On the other hand, CNTs synthesis usually requires metal catalyst or other elements such as hydrogen that do not end up in the CNTs except as impurities. Certain arc discharge and laser process will make limited quantities of CNTs, usually in vacuum, low pressure environments of hydrocarbon gases or inert gases. As a final example of the differences between the synthesis of BNNT and CNT, one of these CNT synthesis processes involve having a steady state ball of liquid carbon; note this would minimally require a temperature of 4,300 C.

In embodiments of the present approach, the boron target for the PVC method is a molten droplet or ball of boron, also referred to as the boron melt, formed from an initial boron feedstock. After formation, the boron melt may be heated by a heat source, such as one or more laser beams, to generate boron vapor. Boron vapor in the presence of nitrogen gas at an elevated pressure drives the BNNT synthesis process. In early experiments, the boron melt was held in place at the tip of a solid boron or boron nitride rod using surface tension/adhesion. The inventors determined that such an approach limits the amount of laser power or heat that can be applied to the boron target, because the boron melt target is prone to detach from the rod. As a consequence, supporting the boron melt limited the BNNT synthesis and production of high quality BNNTs at high yields. Described below are various embodiments of boron melt target holders that overcome this limitation, and significantly increase the BNNT synthesis. For example, prototype apparatus employing the present approaches have shown BNNT yield increases of over 600%, as compared to prior apparatus.

FIG. 1 illustrates the heating zones in embodiments of an apparatus for heating a boron feedstock to a boron melt. As shown in this figure, nitrogen gas may be flowing from bottom to top, and heat may be supplied from one or more sides (e.g., left, right, into the drawing, and out of the drawing). The preheat-support zone 13 includes physical support for the initial boron feedstock (e.g., at start-up), and also for the boron melt 16 generated after and during heating. It should be appreciated that the target holder 17 may be sized to support the particular initial boron feedstock selected, as well as the boron melt 16 formed from the initial boron feedstock, and also should include one or more support structures (not shown) to maintain the location of the target holder 17 within the chamber 15 of the apparatus. The boron melt zone 12 refers to the zone where heat may be introduced to the apparatus chamber 15 and heat the initial boron feedstock to raise the boron feedstock temperature sufficiently high, e.g., to raise the temperature of the boron melt 16 to its smoking point. When the temperature of the boron melt 16 has reached its smoking point, the boron feedstock releases boron and boron-nitrogen molecules into the BNNT growth zone 11. In BNNT growth zone 11, the self-assembly process forms BNNTs.

FIG. 1 also shows interface zone 14 between the boron melt 16 and the target holder 17. The interface zone 14 provides the thermal insulation of the physical support from the boron melt 16. Thermal insulation is useful because the boron melt 16 must reach and may exceed temperatures of 2076 C. In embodiments of the present approach, there may be a temperature gradient across the interface zone 14, such that the target holder 17 remains below its melting point, or a temperature at which it might chemically react with the molten boron melt 16, and yet the boron melt 16 can remain molten. Portions of the boron melt 16 are higher in temperature to reach the smoking point. Preferably, the target holder 17 is cooled sufficiently to prevent its melting. In addition to the cooling methods described below, those of skill in the art may be familiar with known methods for cooling support structures in heated environments. The size of the target holder 17, including its length and cross sections, should be matched to the amount or rate of heat flowing to the target holder 17 from the interface zone 14, and the amount or rate of cooling provided. The quantities of heat flowing into the target holder may also depend on the size of the boron melt 16, the amount of heat being supplied to the boron melt 16, and the amount of cooling from the nitrogen gas within the overall containment volume of the chamber 15.

The interface zone 14 material may be boron nitride and/or a thin layer of nitrogen gas. Boron nitride melts at 2973 C, and can support the boron melt 16 if the target holder 17 is of appropriate size, material, and cooled as discussed above. A boron nitride interface zone layer 14 may be formed by maintaining a temperature gradient between the initial boron feedstock and the target holder 17, and heating the initial boron feedstock. The boron nitride interface zone 17 forms as the boron feedstock is heated to near its melting point. However, in some embodiments the boron nitride interface zone 14 layer may be inserted at the start of the process. For example, a layer of boron nitride may be deposited on the target holder 17, such as prior to placing the initial boron feedstock on the target holder 17, or before heating begins.

The nitrogen gas contained in the chamber 15 can also be utilized to provide both heat and cooling in the process. The nitrogen gas, or a portion thereof, can be heated by supplemental heating elements in all three zones, 11, 12 and 13. The target holder 17, boron melt 16, and the self-assembly zone 11 can be heated or cooled by controlling the flow of nitrogen gas in those zones. Heat sources, baffles, and water cooled elements can be utilized separately or in combinations, to achieve the desired nitrogen gas flow patterns and heat exchanges.

Figure 2A:
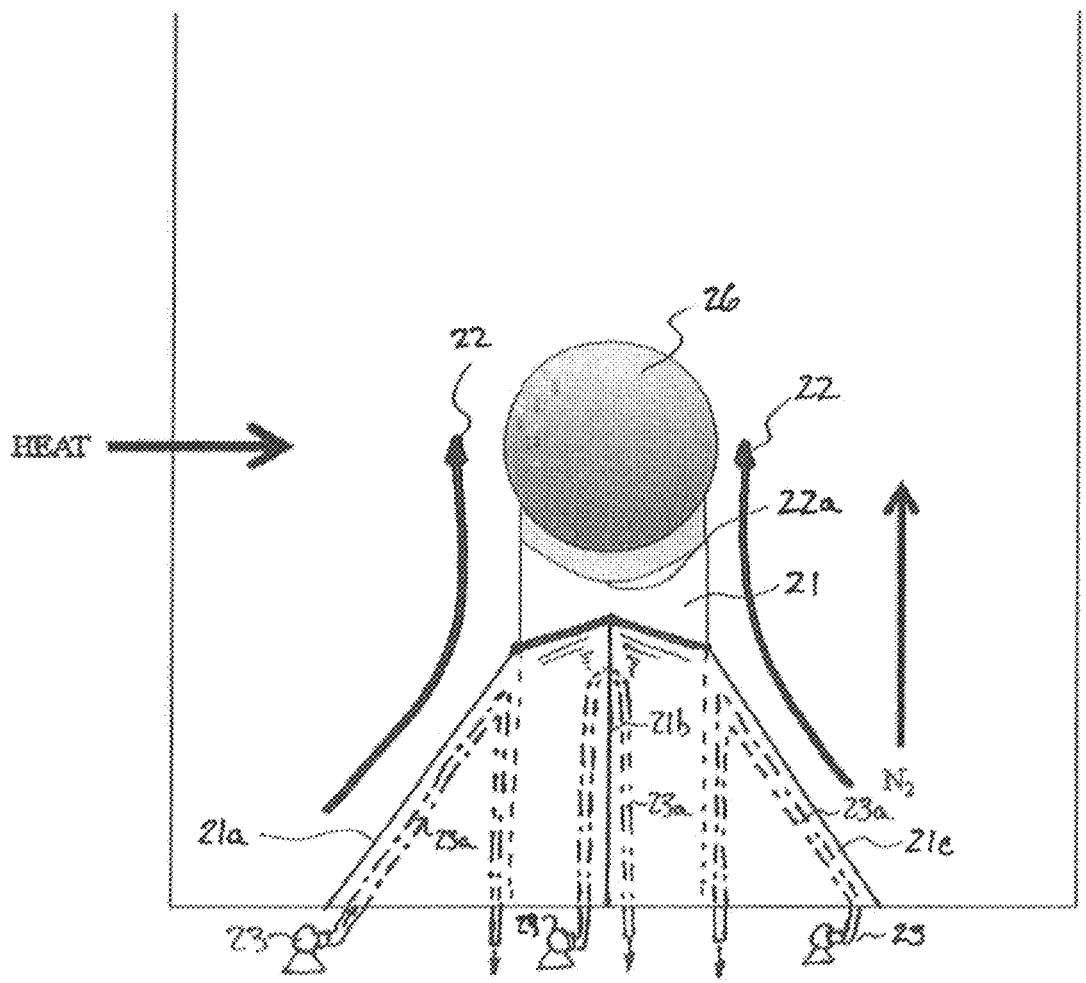
FIGS. 2A, 2B, 2C and 2D show an embodiment of an apparatus for heating a boron feedstock to a boron melt with several techniques for managing the nitrogen gas flow.

FIGS. 2A-2D illustrate several embodiments of a target holder. FIG. 2A shows a target holder having a cooled post 21 supporting the boron melt 26. Post 21 may include cooling elements, such as water cooling system 23. The boron feedstock contact surface 22a of the target holder 21 in this embodiment has a concave shape so as to support the boron melt 26. It should be appreciated that other embodiments may use the shape of contact surface 22a to support the boron material as desired. The material for the post 21 may be chosen from a group of materials with high thermal conductivity, low reactivity with boron, and a relatively high melt temperature. These materials include, for example, copper, molybdenum, and tungsten, as well as alloys of these materials. As discussed above, a thin layer of boron nitride may be included or formed between the boron melt 26 and the post 21, to insulate the boron melt 26 from the post 21, and minimize any reaction of the boron material with the target holder post 21. Target holder 21 may include one or more support structures 21a, 21b, and 21c that provide physical support and stability to e target holder 21, and may also serve as heat transfer elements as discussed below. In this embodiment, support structures 21a, 21b, and 21c form a pyramid-shaped structure and may have a cylindrical hollow middle region for target holder 21. It should be appreciated that other geometries may be used for support structures without departing from the present approach. Support structures may operate as heat sinks to increase the rate of heat transfer from the target holder 21a, 21b and 21c. Additional heat sinks, as are known in the mechanical arts, may be incorporated to the target holder 26.

FIG. 2A shows an example where the boron feedstock is a ball 26 supported by a water-cooled target holder 21. The water-cooling system 23 prevents the holder 21 from melting. In this embodiment, cooling channels 23a are built into support structures 21a, 21b, and 21c. The cooling system 23 may pump cool water into the channels 23a, such that the contact between target holder 21 and support structures 21a, 21b, and 21c, allows heat transfer from target holder 21. It should be appreciated that channels may be built into the target holder 21 and post, and/or other structures of the apparatus (not shown). As discussed above, the amount of cooling needed depends on the amount of heat coming in from the boron melt 26 via the interface zone 14. The amount of cooling is preferably controlled so that the interface zone 14 is not overly cooled, and at the same time there must be sufficient cooling such that the target holder does not melt or chemically react with the boron.

Figure 2B:
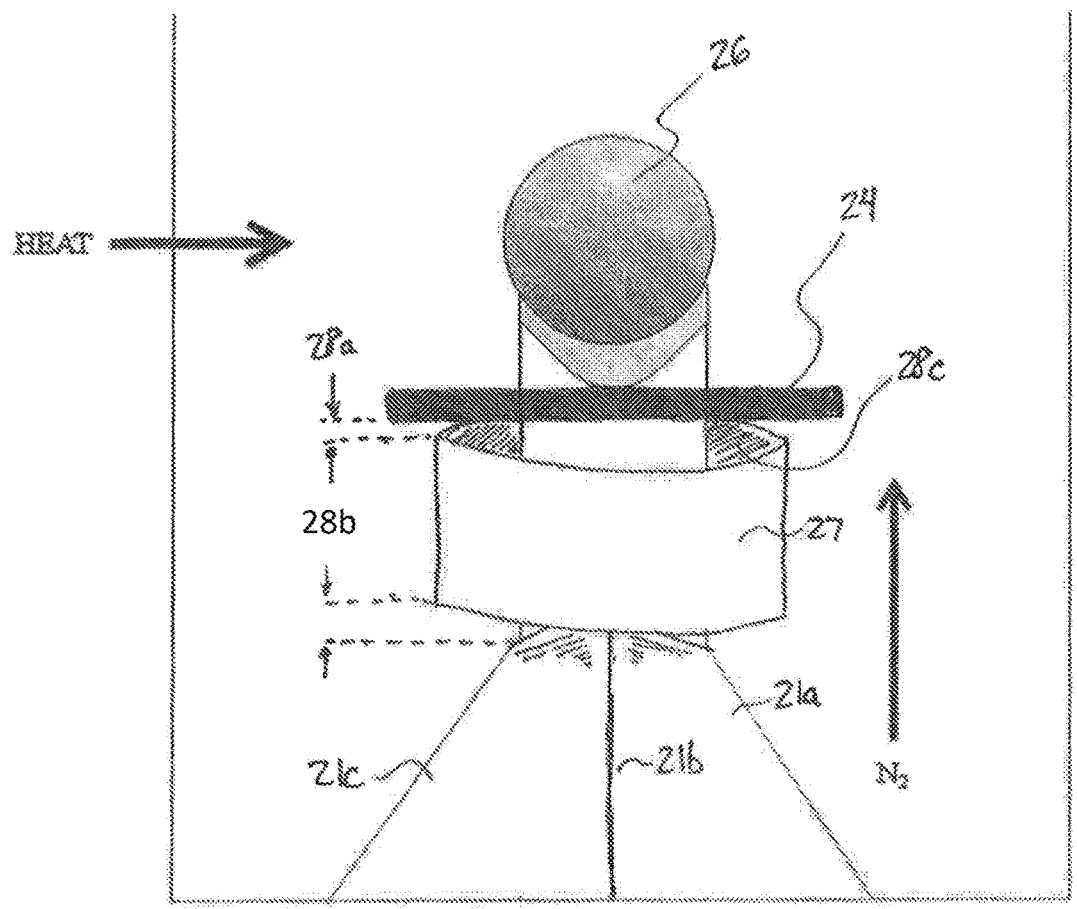

FIG. 2B illustrates a holder which includes a flow baffle 24 which may be used to control and/or deflect the flow of cold nitrogen gas around the target, reducing quenching of the nanotube formation process. In this embodiment, baffle 24 resembles a disc-like ledge extending beyond the outer edge of the target holder 21. It should be appreciated that other geometries may be used for baffling on and/or around the target holder 21. In some embodiments, it is beneficial to keep the nitrogen gas flow 22 near the boron ball 26 as steady, i.e. as laminar, as possible. Thus, some embodiments of a target holder 17 include a flow baffle 24 and flow tube 27, such as a metal or ceramic cylinder or other shape, that can withstand the temperature of the local environment inserted around the heating element with adjustable gaps 28a, 28b, and 28c, to the surrounding support materials to manage the convective flow of the nitrogen gas and thereby assist in extending the region of the growth zone 11. In this embodiment, flow tube 27 resembles a cylindrical structure around a portion of the target holder extending beyond support structures 21a-21c. Gap 28a is present between an upper edge of tube 27 and baffle 24. Gap 28b is present between a lower edge of tube 27 and support structures 21a-21c. Gap 28c is present between the outer radial edge of the target holder and the tube 27, and represents an area through which a portion of nitrogen gas may flow. The gaps may be sized to provide a desired nitrogen gas flow and heat transfer profile for a particular apparatus. Flow control baffle 24 is made from a material with a high service temperature (above about 2000 C) such as tungsten or a ceramic such as boron nitride, silicon carbide or zirconia. The flow control baffle 24 can in some implementations be built into the support post of target holder 21 and in other implementations can be independently supported.

Figure 2C:
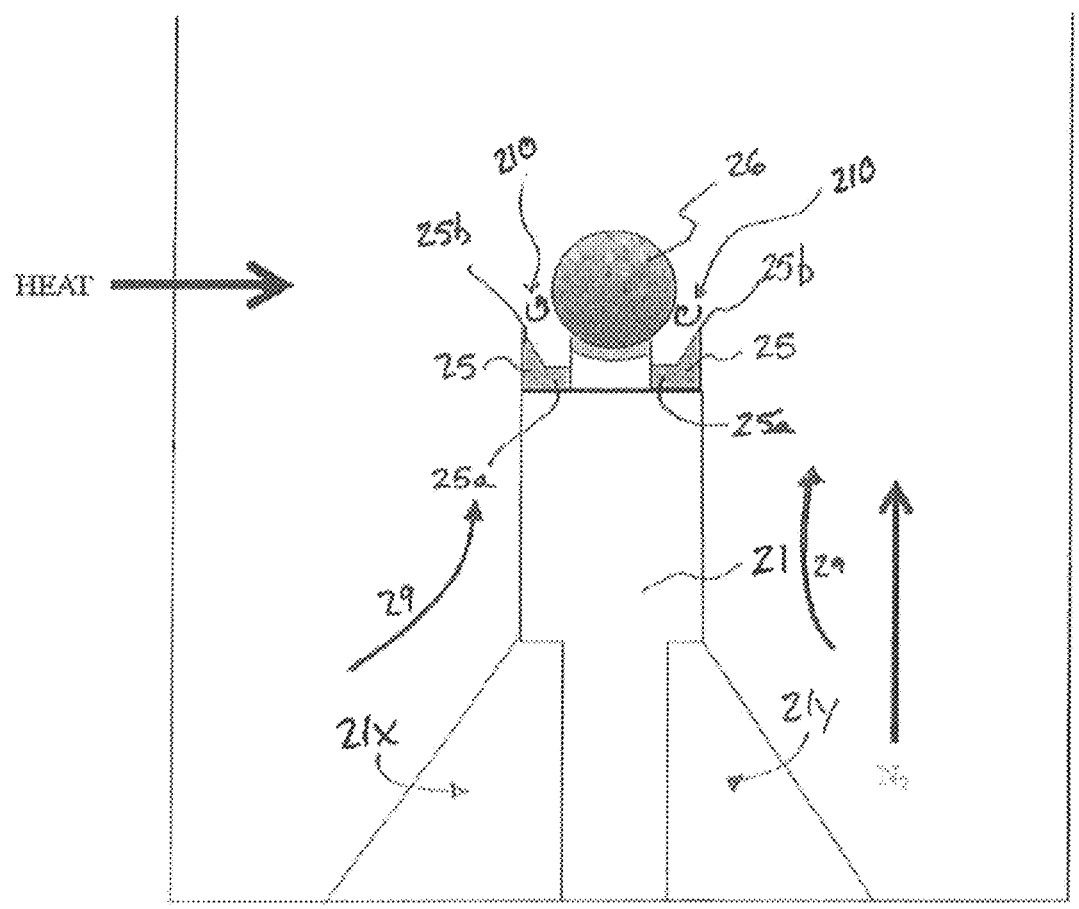
Figure 2D:
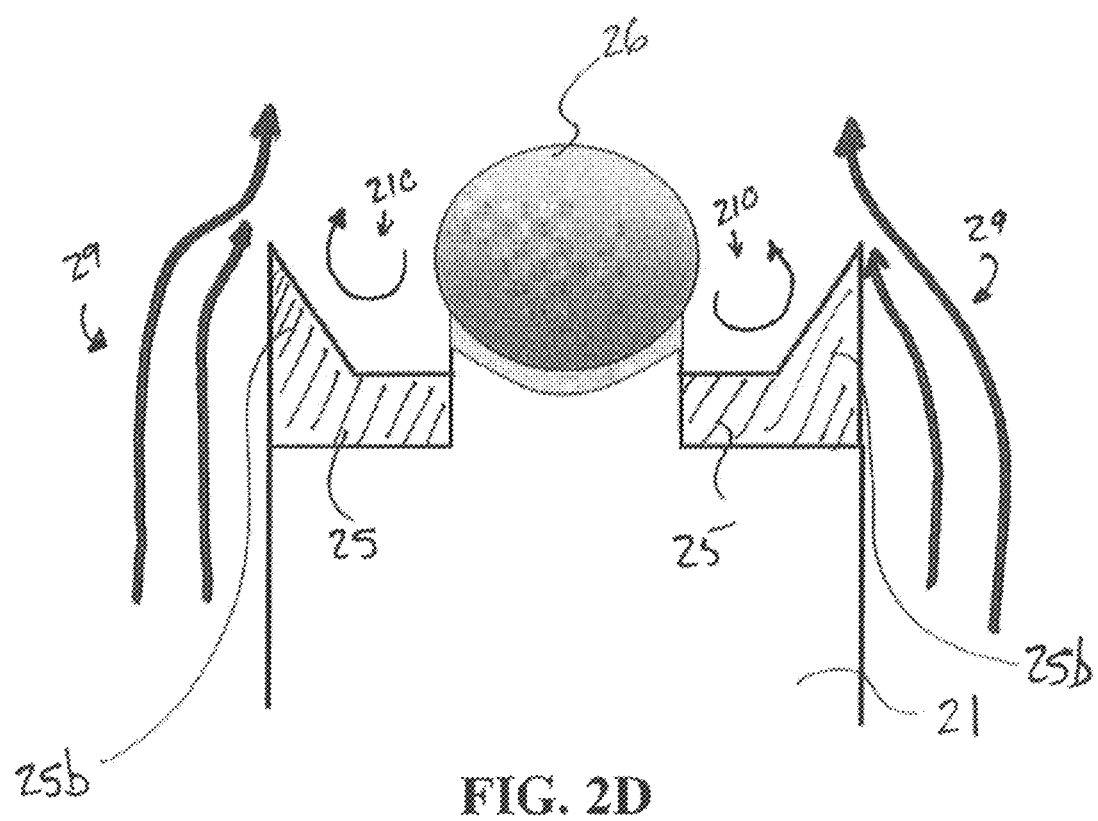

FIGS. 2C and 2D illustrate further embodiments of flow control devices. Generally, these configurations use a ledge 25 having back facing step 25A with a sharp trailing edge 25B to prevent or limit mixing of cold ambient gas 29 with the hot process gas 210, e.g., nitrogen gas that has been heated in the process, and limit subsequent quenching of the nanotube formation process. FIG. 2D shows a close-up view for portion of an embodiment similar to FIG. 2C, having an extended target holder 21 for improved gas pre-heating from the gas having additional surface area to pre-heat. The sharp trailing edge 25B in this embodiment extends farther with respect to the direction of nitrogen gas flow. Although the drawings show flow control devices 25 on opposite sides of the contact surface for simplicity, it should be understood that flow control devices may extend around the entire outer edge of the target holder. As one skilled in the art should appreciate, many target holder configurations and flow control devices can be envisioned, such as using backward facing steps, splitter plates, and airfoils, for example, to implement the present approach. Preferably, embodiments will employ one or more flow control devices that operate at a high temperature and protect the nanotube formation zone from premature cooling by ambient gases.

Figure 3:
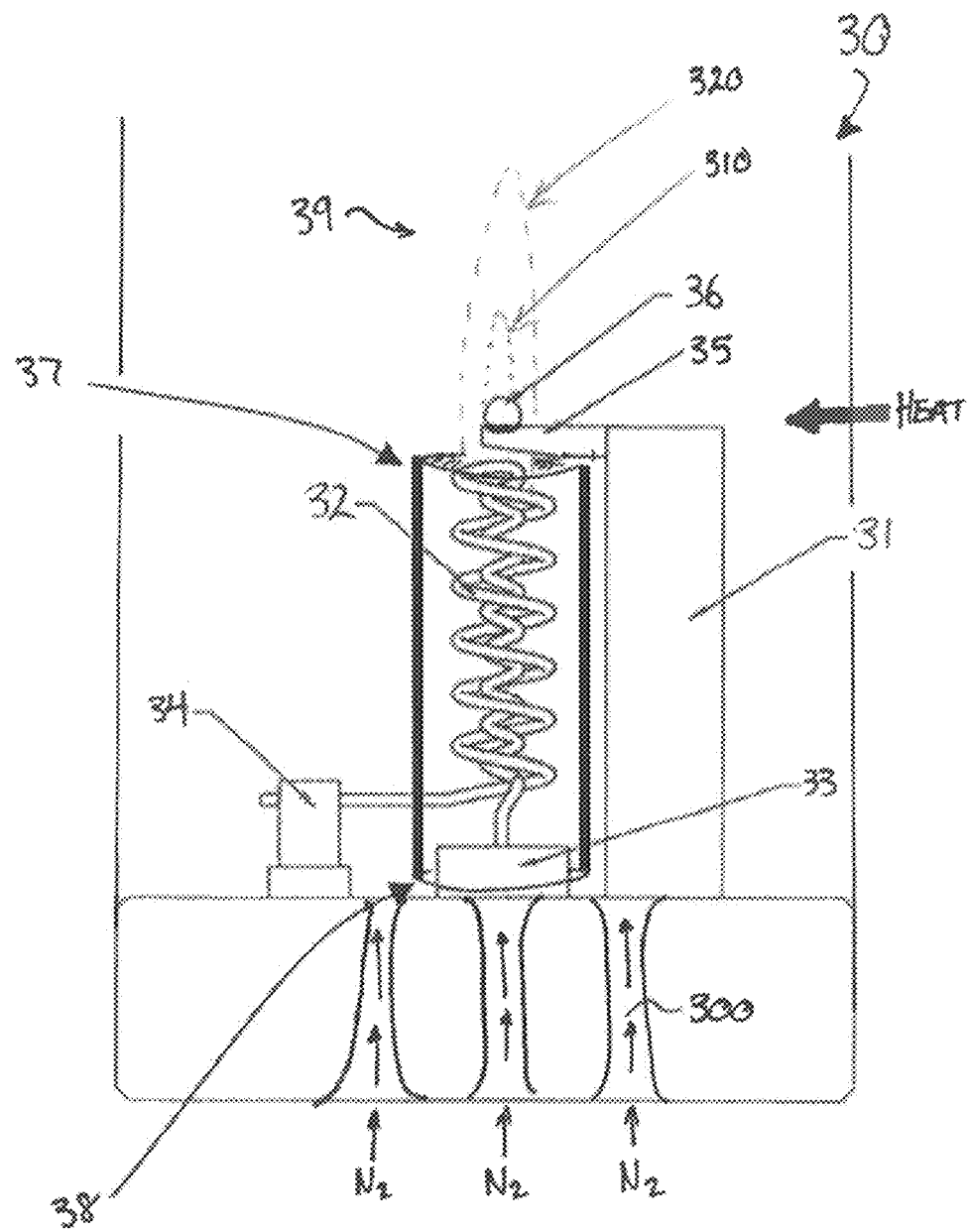
FIG. 3 illustrates another embodiment of an apparatus for heating a boron feedstock to a boron melt with supplemental heat provided to the nitrogen gas.

Some embodiments of the present approach may include a nitrogen gas preheating element. Preheating nitrogen gas may extend the BNNT growth zone, as shown in the comparison between original growth zone 310 and extended growth zone 320. Embodiments featuring a nitrogen gas heating element may incorporate a target holder 35 extending from a sidewall of the chamber 300. An alternative support for the boron melt is shown in FIG. 3 where a water cooled target holder post 31 supports the target holder 35 and the boron melt 36. This configuration demonstrates an embodiment of a process to preheat the nitrogen gas flowing around the boron melt 36. It should be noted that flow and temperature control aspects described above may be incorporated into such embodiments. In this embodiment, nitrogen gas enters the chamber 30 from the bottom of the drawing, and proceeds toward the top of the drawing. One or more nitrogen gas flow channels 300 may be provided for introducing the nitrogen gas flow to the chamber 300. Heating in the preheat-support zone in this embodiment may be provided by a heating coil 32, although other heat sources as are known to those of skill in the art may be used. It is preferable to keep the flow near the boron ball 36 as steady, i.e. as laminar, as possible, so a flow baffle or tube 37 may be inserted around the heating element. Some embodiments of a baffle or tube 37 may include an adjustable gap 38 above a surface of chamber 30, to limit the convective flow of the nitrogen gas and thereby assist in extending the region of the growth zone 39. In this embodiment, the cool nitrogen gas enters the baffle region or tube 37 at the adjustable gap 38. Gap 38 may be altered in terms of height and/or width to generate the desired nitrogen gas flow and heating profiles. The nitrogen gas is then heated by the coil 32 as the nitrogen gas convectively flows over the coil 32 and towards the target holder 35 and boron melt 36. Some embodiments may connect heating coil 32 to water-cooled connectors 33 and 34 if the currents are sufficiently high to require cooling of the connectors. The heating coil may be powered by, for example, direct current external supply (not shown). The heat could also be supplied by using AC current using a metal wire, post or other conductor geometry effective in conveying the heat to the local nitrogen gas. In some embodiments, the heating coil 32 may be formed from or including one or more refractory materials, such as, for example, molybdenum or tungsten. Generally, it may be desirable to avoid rapid reactions between the refractory material and the nitrogen gas. Otherwise, the process may quickly reduce the coil's effectiveness.

Figure 4A:
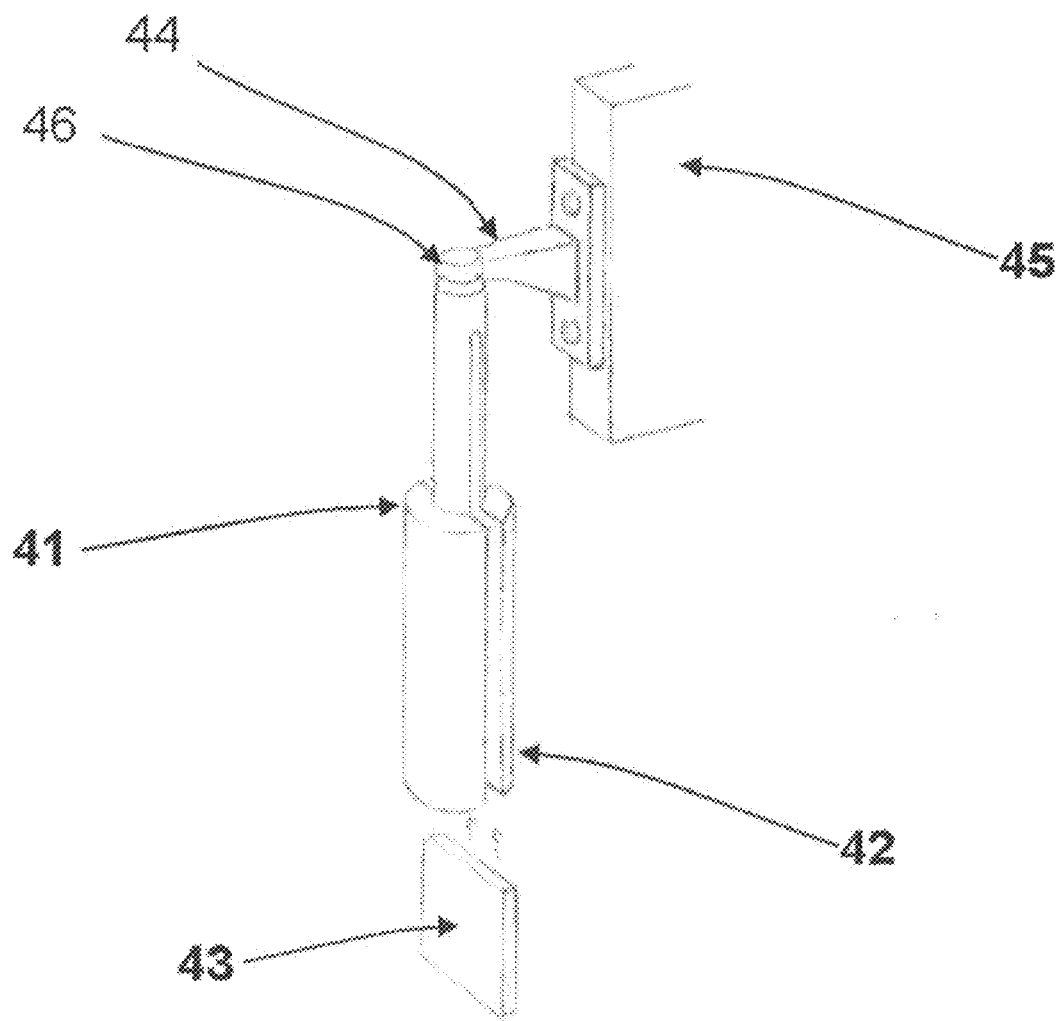
FIGS. 4A, 4B and 4C illustrate another embodiment of an apparatus for heating a boron feedstock to a boron melt with another embodiment of supplemental heat to the nitrogen gas.
Figure 4B:
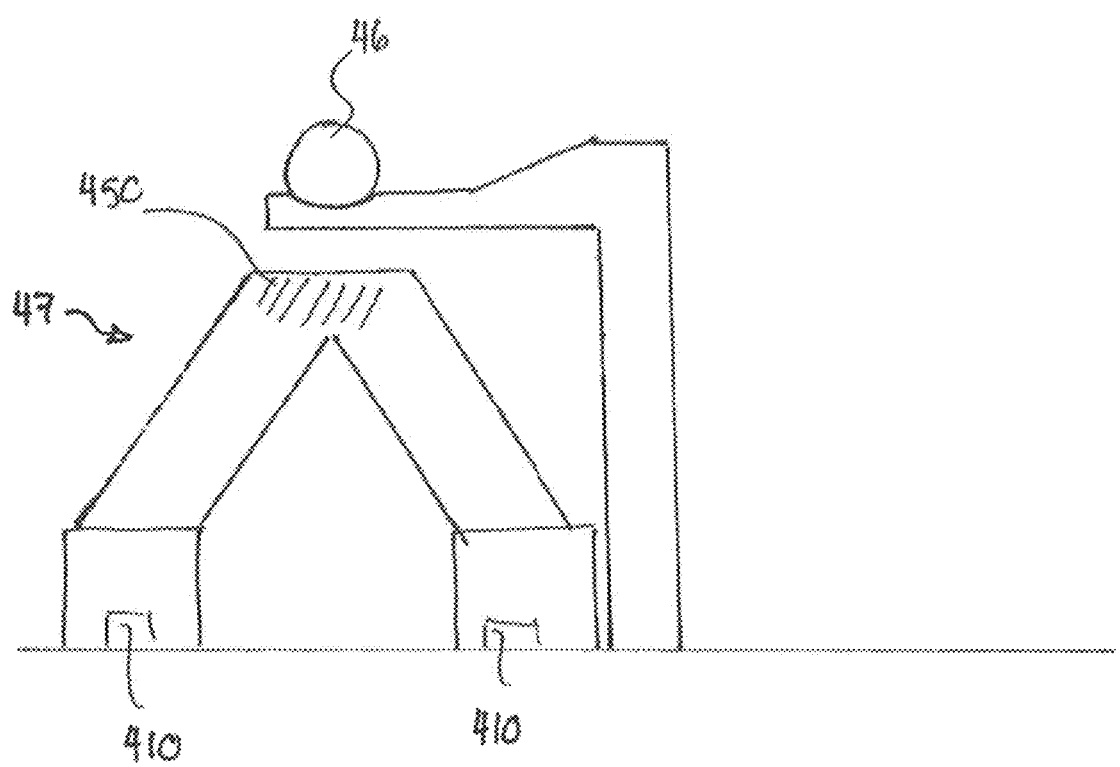
Figure 4C:
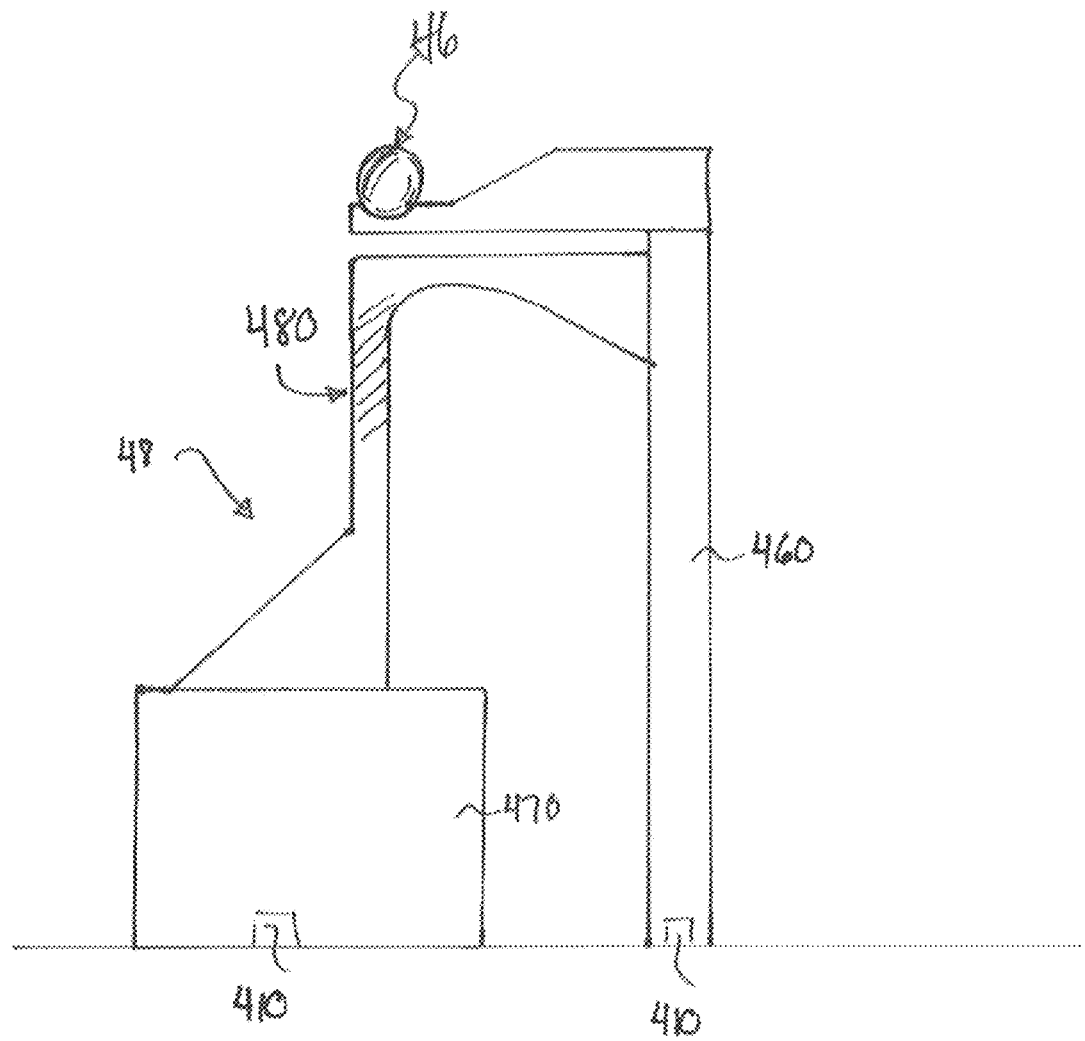

FIGS. 4A, 4B, and 4C illustrate embodiments of an apparatus for synthesizing BNNTs, including a target holder 46 and nitrogen gas heating elements 41 and 42. In the embodiment shown in FIG. 4A, the heating elements 41 and 42 include graphite heater elements 41 and 42. Graphite provides certain advantages as it has minimal chemical reaction to the heated nitrogen gas compared to some metals. In this embodiment, graphite heater elements 41 and 42 include a ceramic spacer 43 between parallel graphite heater elements 41 and 42. Graphite heater elements 41 and 42 may be connected to electrodes as shown in FIG. 3 and the may be cooled, such as, for example, through cooling clamps. Spoon 44 may be configured to hold the boron melt 46, such that heat from the graphite heater elements 41 and 42 transfer to the boron melt 46. Spoon 44 may be cooled, such as through connection to a cooling strut 45. Flow baffling, not shown, such as the flow baffle 24 as describe for FIG. 2 can be added. It should be appreciated that variations in these embodiments are possible without departing from the principles described herein. The baffles 24 and 25 shown in FIG. 2 and the tube 37 shown FIG. 3, can also be added to the embodiment shown in FIG. 4 to beneficially affect the growth zone above the boron melt 46.

For example, FIGS. 4B and 4C show embodiments of an apparatus for heating a boron feedstock to a boron melt in which the heating elements include grafoil heater elements 47 and 48. In the inverted V geometry shown in FIG. 4B, the electric current to heater element 47 is fed from the bottom through electrodes 410, which may be, for example, copper electrodes, to produce hot zone 450. In the embodiment shown in FIG. 4C, the current flows from the support post 460 to the bottom 470, producing hot zone 480, In both geometries of heater elements 47 and 48, the shape and thickness of the grafoil may be adjusted to maximize the heating of the surrounding nitrogen gas near the boron melt 46. The grafoil arrangements 47 and 48 allow for tailoring of the electrical resistance of the grafoil such that resistance heating creates the highest temperature of the grafoil nearest the location of the boron melt 46. As one skilled in the art of working should appreciate, a large variety of grafoil geometries can be created such as to optimize the local heating of the surrounding nitrogen gas as it convectively flows towards the boron melt 46 and on to the BNNT growth zone 11 as seen in FIG. 1 above the boron melt 46. Flow baffling, not shown, such as the flow baffles 24 and 25 as describe for FIG. 2 can be added.

The embodiments shown in FIGS. 2, 3 and 4 may use supplemental heating in the preheat-support zone to preheat the nitrogen gas feeding into the boron melt. The goal is to optimize the distribution of heat going into the BNNT formation process such that the BNNTs have the maximum residence time in the growth zone 11 as seen in FIG. 1. It should be appreciated that the particular configuration of an apparatus and process will depend on the size, geometry, and configuration of the particular embodiment. Preferably, the preheating of the nitrogen gas in zone 13 does not result in the formation of undesired boron nitride compounds such as amorphous BN, short BNNTs, i.e. less than a few hundred nanometers for a given segment, with very large numbers of walls, i.e. 10 and greater, and large hexagonal boron nitride, h-BN, particles that do not lead to the formation of high quality HTP BNNTs, These undesirable conditions can occur if the heating is insufficient. By controlling the heat distribution and by the addition of baffling to manage the nitrogen gas flow so as to keep it in the laminar or steady regime, adding heat in zone 13 results in additional heat going into the boron melt in zone 12 and in additional residence time for the growth of HTP BNNTs in zone 11.

Figure 5:
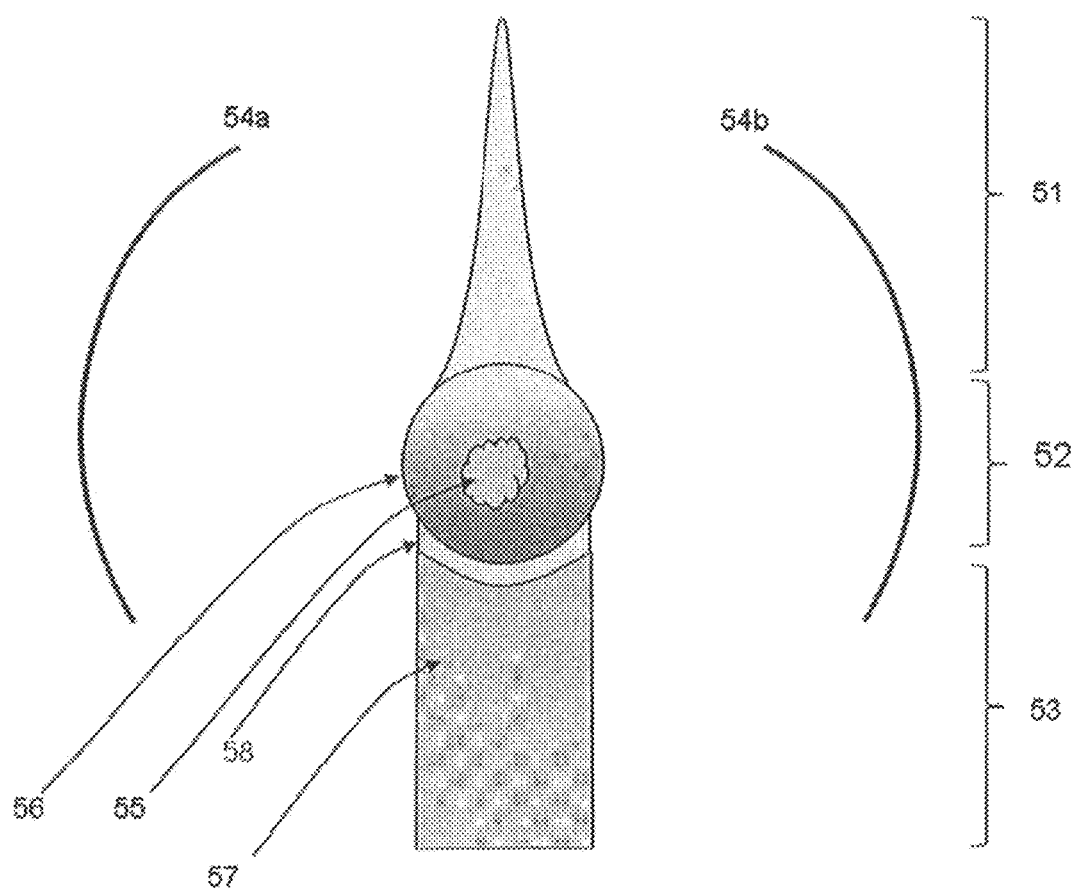
FIG. 5 illustrates the use of mirrors in an embodiment.

As described in related applications International Patent Application No. PCT/US14/063349, and International Patent Application No. PCT/US15/27570, the contents of which are expressly incorporated by reference, heat may be applied directly to a boron feedstock and, after a boron melt is generated, to the boron melt. FIG. 5 illustrates a boron melt 56 formed on a post 57 (which may or may not be independently heated, as described above). Preheat-support zone 53, boron melt zone 52, and BNNT growth zone 51, are shown in this embodiment as separate, but it should be appreciated that they may overlap; the interface zone 58 is between the preheat-support zone 53 and the boron melt zone 52. The heating of the boron melt 56 in the boron melt zone 52, can be achieved by numerous means, including, for example, one or more of lasers, direct arc, and inductively coupled plasma (ICP). The heating element(s) may be selected for various reasons, including, for example, heat element cost, heating efficiency, heating requirements, the size of the boron feedstock and/or boron melt 56, and the nitrogen flow conditions. For example, if the boron melt 56 is sufficiently large to require mechanical support as discussed above for FIGS. 2, 3, and 4, then an ICP might not be the most efficient heating element. Additional heat can be supplied to the boron melt zone 52 through additional heating elements. In embodiments using laser heating and black body reflected heating, additional heat may be supplied to boron melt zone 52 through the addition of mirrors 54a and 54b. The resultant improvement involves heating the target from multiple angles to create multiple points from which boron vapor is liberated from the boron melts molten surface.

Other implementations of this concept can readily be achieved using combinations of other beam splitters and/or beam-shaping mirrors, for instance paraboloids, ellipsoids, conic sections, rings, and multiple flat mirrors, or combinations thereof. Fiber optic coupling could also be used to create multi-angle pumping of the target.

Figure 6:
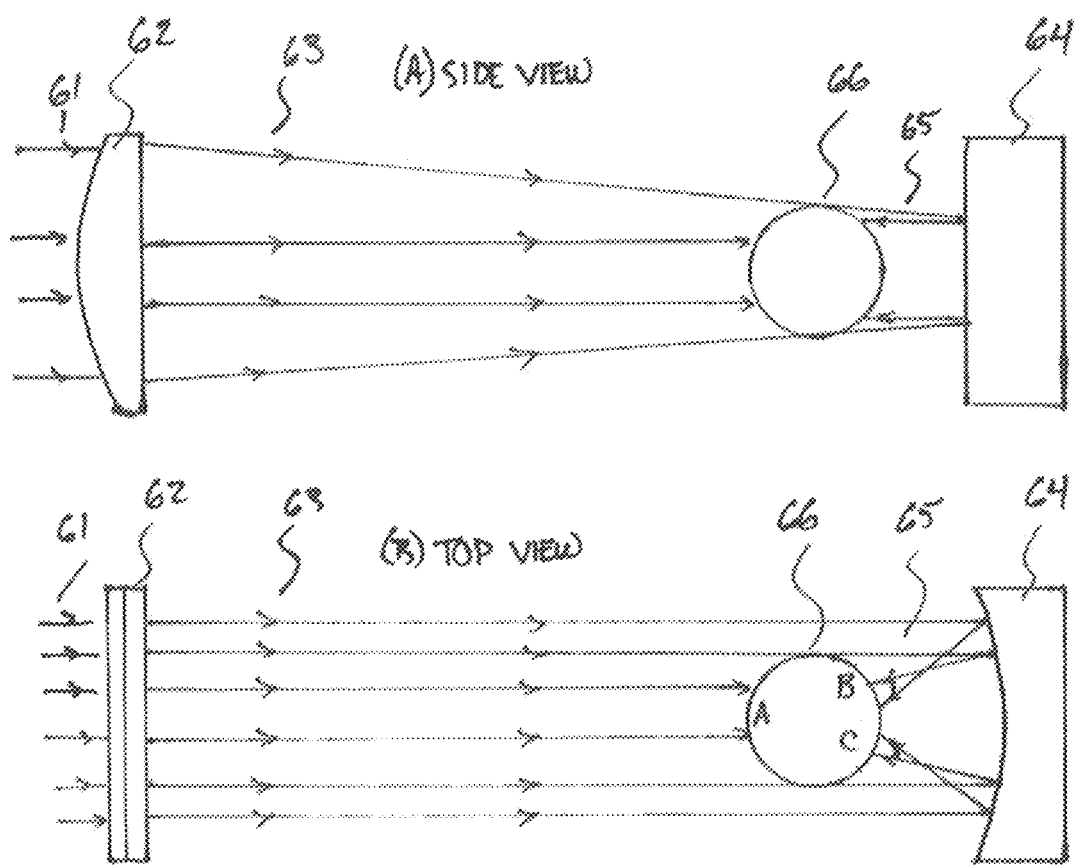
FIG. 6 shows an embodiment of an apparatus splitting a single laser beam into several beams for generating a boron melt.

In embodiments using laser heating to generate and maintain the born melt 56, mirrors 54a and 54b may be used to direct portions of a laser beam that miss or reflect from the boron melt 56, back onto the boron melt 56 and thereby heating multiple areas on the boron melt 56 via a single laser. FIG. 6 shows from (A) a side view and (B) from a top view, an example where a single laser beam 61 is focused by a lens 62 or other suitable optics such that the focused beam 63 or intercepts the boron melt 66 but a large fraction of the incident beam 61 misses the boron melt, is then reflected 65 by a mirror 64 back on to the boron melt. In more detail, the laser beam travels from left to right through a plano-convex cylindrical lens 62 which converts it to a thick 'laser sheet.' The laser sheet partially passes over the boron melt 66 on the way to a plano concave reflector 64. A portion of the laser sheet is absorbed on the left surface of the target (indicated by 'A'), and the reminder of the sheet strikes the reflector where it illuminates the right side of the target (indicated by 'B' and 'C') in the Top View of FIG. 6. Thus the target is illuminated in 3 separate regions, greatly increasing the generation of boron vapor and the production of BNNTs. At elevated power levels for some size boron melts 66 and laser poser, the mirror 64 must be water cooled. The geometry and position of a mirror, as well as the number of mirrors, may depend on the relative size and shape of the apparatus' chamber, as well as the amount of desired heat from redirected beams. In addition, a mirror 54a and 54b can reflect black body radiation from the boron melt 56 back on to the boron melt 56, increasing the overall heating efficiency. An important consideration in the laser beam or laser beams is that for some embodiments the power levels are sufficient such that for some size boron melts 66 the momentum transfer of the laser light 63 and 65 on the boron melt will push the boron melt 66 off the support post or 57 or spoon 44 unless the forces from the light are appropriately balanced around the circumference of the boron melt 66.

As one of ordinary skill in the art should appreciate, the multiple baffles and flow control elements such as 24, 28 and 38 when combined with heat sources such as lasers 61 and ICP can also be used to manipulate the heat including providing additional heat to the nanotube self-assembly region 11 and 51.

The mechanical structures, water cooling for the coils and surrounding surfaces, the nitrogen pressure chamber and the systems to harvest the BNNTs are not shown in the FIGS. 1-6. As one of ordinary skill in the electromechanical design and construction in the art of working elevated pressure electromechanical systems should appreciate, a very diverse number of arrangements for the heat sources, cooling and electromechanical arrangements can be combined to provide the efficient production of BNNTs. For example, see related applications U.S. Provisional Patent Application No. 62/164,997, International Patent Application No. PCT/US14/063349, and international Patent Application No. PCT/US15/27570, which are incorporated by reference.

As described herein, synthesis of BNNTs, including high quality BNNTs, can be enhanced by management of the heat going into and out of the preheat-support, BNNT melt, and self-assembly zones, the control of the nitrogen gas flow through the chamber in the process, and the interfacing between the boron melt and the target holder. Heat may be applied to one or more of the zones to enhance BNNT formation, and the target holder and support structures may be used to manage the flow of heat and nitrogen gas through the chamber. Baffles and tube structures may be incorporated to control the flow of nitrogen gas to keep in the preferred laminar or steady flow condition, e.g. not unsteady or turbulent flow conditions. Through implementing one or more of the present approaches, BNNT synthesis process may be enhanced, including for example the yield of high quality HTP BNNTs both in terms of quality, e.g. highly crystalline with few defects and lengths greatly in excess of several hundred microns, and in terms of quantity.

The terminology used herein is for the purpose of describing particular embodiments only and is not intended to be limiting of the approach. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The principles described herein may be embodied in other specific forms without departing from the spirit or essential characteristics thereof. The present embodiments are therefore to be considered in all respects as illustrative and not restrictive.

What is claimed is:

1. An apparatus for synthesizing boron nitride nanotubes, the apparatus comprising:
    a chamber configured to receive nitrogen gas in a first direction;
    a target holder having a boron feedstock contact surface and a post, the post supporting the target holder in a desired position within the chamber;
    a heat source for heating a boron feedstock on the target holder; and
    at least one mirror positioned in the chamber and configured to reflect heat from the heat source towards the target holder.

2. The apparatus of claim 1, wherein the target holder comprises at least one flow control baffle to modify the nitrogen gas flow in the first direction.

3. The apparatus of claim 1, wherein the heat source comprises a laser having a beam path, and further comprising a plano-convex cylindrical lens positioned in the beam path.

4. The apparatus of claim 3, wherein the mirror comprises a plano concave reflector positioned in the beam path downstream of the plano-convex cylindrical lens and the target holder.

5. The apparatus of claim 2, wherein the at least one flow control baffle is configured to maintain laminar flow of the nitrogen gas near the contact surface.

6. The apparatus of claim 1, wherein the mirror is further configured to reflect black body radiation toward the target holder.

7. The apparatus of claim 1, wherein the heat source is configured to heat a first side of the boron feedstock, and the mirror is configured to reflect heat towards a second side of the boron feedstock.

8. The apparatus of claim 7, wherein the second side is substantially opposite the first side.

9. An apparatus for synthesizing boron nitride nanotubes, the apparatus comprising:
    a chamber configured to receive nitrogen gas in a first direction;
    a target holder having a boron feedstock contact surface and a post, the post supporting the target holder in a desired position within the chamber;
    a heat source for heating a boron feedstock on the target holder;
    at least one flow control baffle to modify the nitrogen gas flow in the first direction; and
    at least one mirror positioned in the chamber and configured to reflect heat towards the target holder.

10. The apparatus of claim 9, wherein the heat source comprises a laser having a beam path, and further comprising a plano-convex cylindrical lens positioned in the beam path.

11. The apparatus of claim 10, wherein the mirror comprises a plano concave reflector positioned in the beam path downstream of the plano-convex cylindrical lens and the target holder.

12. The apparatus of claim 9, wherein the at least one flow control baffle is configured to maintain laminar flow of the nitrogen gas near the contact surface.

13. The apparatus of claim 9, further comprising at least one heat sink on at least one of the target holder and the post, the heat sink configured to increase the rate of heat transfer from the target holder.

14. The apparatus of claim 9, wherein the contact surface is a concave surface.

15. The apparatus of claim 9, wherein the mirror is further configured to reflect black body radiation toward the target holder.

16. The apparatus of claim 9, wherein the target holder is comprised of at least one of copper, molybdenum, tungsten or an alloy of two of these materials.

17. An apparatus for synthesizing boron nitride nanotubes, the apparatus comprising:
    a chamber configured to receive nitrogen gas in a first direction;
    a target holder having a boron feedstock contact surface and a post, the post supporting the target holder in a desired position within the chamber;
    a heat source for heating a target region on the target holder;
    at least one flow control baffle configured to maintain laminar flow of nitrogen gas near the target holder; and
    at least one reflective surface in the chamber configured to reflect heat toward the target region.

18. The apparatus of claim 17, wherein the reflected heat comprises at least one of heat from the heat source and black body radiation from the target region.

19. The apparatus of claim 17, wherein the heat source is configured to heat a first side of the target region, and the reflective surface is configured to reflect heat toward a second side of the target region.

20. The apparatus of claim 19, further comprising a second reflective surface in the chamber and configured to reflect heat toward a third side of the target region.

* * * * *